US005096487A

United States Patent [19]

Schell

[11] Patent Number: 5,096,487

[45] Date of Patent: Mar. 17, 1992

[54] FOUNTAIN COMPOSITION FOR USE IN OFFSET PRINTING

[75] Inventor: Loni Schell, Hofheim-Wallau, Fed. Rep. of Germany

[73] Assignee: Hoechst Aktiengesellschaft, Frankfurt am Main, Fed. Rep. of Germany

[21] Appl. No.: 401,796

[22] Filed: Sep. 1, 1989

[30] Foreign Application Priority Data

Sep. 8, 1988 [DE] Fed. Rep. of Germany ... P3830467.8

[51] Int. Cl.[5] ...... C09K 3/18

[52] U.S. Cl. ...... 106/2

[58] Field of Search ...... 106/2

[56] References Cited

U.S. PATENT DOCUMENTS

| | | | |
|---|---|---|---|
| 4,647,392 | 3/1987 | Darden et al. | 252/75 |
| 4,764,213 | 8/1988 | Gventer et al. | 106/2 |
| 4,798,627 | 1/1989 | Schmitt et al. | 106/2 |

FOREIGN PATENT DOCUMENTS

| | | |
|---|---|---|
| 0251621 | 1/1988 | European Pat. Off. |
| 62-218190 | 9/1987 | Japan |

OTHER PUBLICATIONS

Grant & Hackh's Chemical Dictionary, 5th Ed., Mar. 31, 1988, p. 78.

*Primary Examiner*—William R. Dixon, Jr.
*Assistant Examiner*—Helene Klemanski
*Attorney, Agent, or Firm*—Foley & Lardner

[57] ABSTRACT

A fountain composition for use in offset printing is disclosed comprising a viscosity-regulating hydrophilizing agent, a buffer substance at least one triazole and at least one non-hydroxylated dicarboxylic acid or salt thereof. By means of the invention, corrosion, in particular on the nickel-plated parts, above all the nickel-plated printing cylinders of printing machines, is considerably reduced, in particular viewed over a prolonged period.

21 Claims, 2 Drawing Sheets

FOUNTAIN COMPOSITION FOR USE IN OFFSET PRINTING

BACKGROUND OF THE INVENTION

The invention relates to a fountain composition for use in offset printing, and to a fountain solution comprising the composition.

In offset printing, aluminum plates which have a hydrophilic surface (non-printing areas) and carry an oleophilic layer in the image areas (printing areas) are clamped on an impression cylinder which is frequently provided with a nickel plating. The hydrophilic and oleophilic areas are in the same plane (planographic printing). Besides the printing ink (greasy), a so-called fountain solution is required for printing. The fountain solution keeps the image-free areas in a hydrophilic state, such that ink is only accepted by the oleophilic image areas and is transferred to the paper via the rubber blanket. In order to improve the printing result, substances which are to optimize, for example, viscosity, pH value and compatibility with the printing ink and prevent faults which may be caused by regionally different water qualities, by the paper or by microorganisms, are customarily added to the fountain solution.

The most favorable pH range for printing is between 4.7 and 5.3 and is normally maintained by buffer substances such as, for example, citric acid/citrate. U.S. Pat. No. 4,548,645 also discloses salts obtained from polycarboxylic acids and organic bases, for example amines, which are employed for this purpose. The hitherto used fountain compositions, however, produce corrosion phenomena in the printing machines, which occur, in particular, on the plate and blanket cylinders provided with a nickel plating and may give rise to considerable machine down-times and repair costs.

Many attempts have therefore been made to reduce or prevent corrosion on machine parts, in particular, on the nickel plated cylinders of printing machines.

In DE-A 35 36 485 a fountain composition is described which, with the view to reducing corrosion phenomena, contains copper ions, in addition to the usual components including water, substances producing an increase in viscosity, buffers based on citric acid, surfactants and fungicides. Using this fountain composition, nickel erosion can be reduced as long as copper ions are present.

This means that in these fountain compositions the copper, being an electrochemically noble metal, is deposited on the generally used baser aluminum support and this may lead to scumming phenomena during printing; moreover, the copper ions which are only present in small quantities are removed from the fountain solution and are thus lost for the protection against corrosion.

EP-A-0 108 883 describes a process for avoiding corrosion on printing machine cylinders, in which 1 H-benzotriazole is added to the fountain composition as a corrosion inhibitor. In this process, a pH value of 5.5 or higher should be maintained.

SUMMARY OF THE INVENTION

Accordingly, it is an object of the present invention to provide a fountain composition which is suitable for use in the pH range from about 4.7 to 5.3, which ensures corrosion inhibition, in particular, for a relatively long term.

Another object of the present invention is to provide a fountain composition which does not reduce the printing quality of aluminum printing plates.

In accomplishing the foregoing objectives, there has been provided, in accordance with one aspect of the present invention, a fountain composition for use in offset printing which comprises a viscosity-regulating hydrophilizing agent, a triazole and a non-hydroxylated dicarboxylic acid and/or a salt thereof.

In accordance with another aspect of the present invention there is provided a fountain solution for offset printing machines which comprises the above-described composition.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawings by which

DETAILED DESCRIPTION OF PREFERRED EMBODIMENTS

Figure 1:
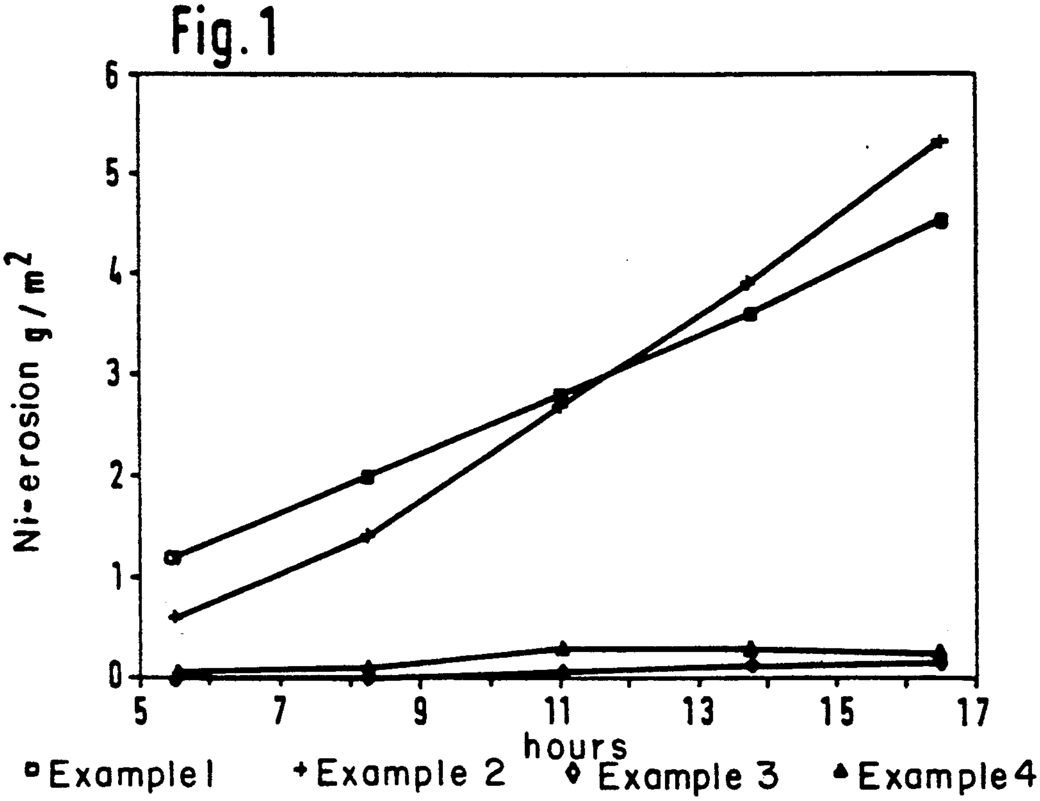
FIGS. 1-3 are graphs of nickel erosion resulting from treatment with fountain solutions according to the invention as compared to known fountain solutions, as a function of time.

Suitable triazoles are, for example, triazoles substituted by aromatic groups and those which contain electron donors. Preferred are 1H-benzotriazole and tolyltriazole, in particular, tolyltriazole. Dicarboxylic acids which are capable of being combined and their salts, within the context of the present invention, can be aliphatic or aromatic.

Dicarboxylic acids having 4 to 10 carbon atoms are particularly suitable. Preferred are, for example, glutaric acid, succinic acid, adipic acid, and benzene-1,2-dicarboxylic acid. Hydroxylated dicarboxylic acids are not suitable for use. Aminodicarboxylic acids, for example aminosuccinic acid, and branched dicarboxylic acids, for example methyladipic acid, can also advantageously be used.

The triazoles are used with the dicarboxylic acids in a ratio of about 2:1 to 1:20, preferably 1:1 to 1:10. To obtain a fountain solution concentrate the amount of the mixture added to the solution is such that the solution contains about 0.3 to 5% by weight of triazole and about 1 to 15% by weight, preferably 2 to 10% by weight, of dicarboxylic acid.

To dissolve triazole and dicarboxylic acids in the fountain solution applied, dissolving intermediaries can be employed. In order to adjust the viscosity which is important for the printing process and also to effect the formation of a protective coating during machine stoppage, the fountain composition, in general, contains appropriate hydrophilic thickening agents, for example, modified starch or cellulose, polyols, polyglycols or similar substances customarily used for this purpose. It is moreover possible to use further additives which improve the printing characteristics, for example, solvents, sequestering agents, surfactants, preferably in a non-ionic form, defoamers, biocides and the like.

Ammonium salts of the general formula $R_nH_mN^+X^-$, wherein n is 1 to 4, m is 0 to 3, (n+m) is 4 and R is alkyl and/or aryl, preferably, however, alkyl, are advantageously added to the fountain composition. The anion is here preferably derived from a carboxylic acid. In this embodiment, the corrosion-reducing effect appears particularly clearly, in particular over a prolonged period of time.

To maintain the optimum pH range buffer mixtures are required. According to the invention, the non-hydroxylated dicarboxylic acids with their salts and/or other weak acids and/or their salts are utilized for buffer formation. Acids of this kind are particularly monocarboxylic acids or inorganic acids. An excellent buffer effect is, in particular, obtained if the dissociation constant is between about $5\cdot10^{-4}$ and $8\cdot10^{-5}$ in the first stage.

The particular advantage of the combination according to the invention comprising triazole and dicarboxylic acids is shown by the fact that, after a markedly reduced initial erosion, the further removal of nickel comes almost or completely to a standstill.

In order to obtain an additional corrosion inhibition for the printing machine parts comprising unprotected iron members, a corrosion inhibitor for iron is added to the fountain composition in those cases, in which this additional protection is desirable or unavoidable. An addition of phosphoric acids, such as ortho- or polyphosphoric acids, in particular, orthophosphoric acid and/or its salts has proven particularly useful.

Although corrosion on the nickel-plated parts is slightly increased by the addition of these inhibitors based on phosphoric acid or phosphate, it is nevertheless brought back to a constant final value below 1 $g/m^2$ by adding the above-identified ammonium salts.

Depending on its formulation, the fountain composition is offered to the consumer in a solid, semi-solid or moist-pasty form and is subsequently diluted by the consumer using an appropriate quantity of optionally partially or fully demineralized water. In general, the fountain solution used in the machines during printing contains about 0.5 to 5.0% by weight, preferably 1.0 to 3% by weight, of the fountain composition according to the invention.

In the following, the invention is explained by means of selected examples.

EXPERIMENTAL PERFORMANCE OF TESTS

In preliminary tests it had been found that determination of corrosion as the weight loss, merely after a predetermined immersion time in the fountain solution, may give rise to misleading judgments for practical application.

The tests were therefore carried out on completely nickel-plated test plates which had a surface area of 58 $cm^2$ and were alternately exposed to air (70 times at room temperature) and the fountain solution to be tested (70 times at 20° C.), within the course of 1 minute. The nickel layer had a thickness of 50 μm.

The fountain solutions used in the tests contained 2% by weight of the formulations specified in the following examples.

Every 2.75 hours, the fountain solution used in each case was replaced by a fresh solution. Any coats which loosely adhered to the plate were removed and the plate was then rinsed with distilled water and with alcohol and dried and the weight loss, as compared with the untreated plate, was determined at room temperature.

TABLE 1

| | | Comparison | | Invention | |
|---|---|---|---|---|---|
| Example | | 1 | 2 | 3 | 4 |
| polyglycol 400 | | 2 | 2 | 2 | 2 |
| tolyltriazole | | 1 | — | 1 | 1 |
| 1 H-benzotriazole | | — | 1 | — | — |
| *citric acid.1$H_2O$ | | 7.4 | — | — | — |
| tartaric acid | | — | 5.2 | — | — |
| adipic acid | | — | — | 5.3 | — |
| benzene-1,2-dicarboxylic acid | | — | — | — | 5.8 |
| i-propanol | | 20 | — | 20 | 20 |
| fully demineralized water + NaOH, for adjustment to pH **up to 100 | ** | 4.98 | 4.98 | 5.05 | 5.04 |
| 2% strength dilution in distilled water | pH | 5.3 | 4.8 | 4.7 | 4.7 |

*customarily contained in fountain compositions (e.g. DE-A 35 36 485)

The components indicated in the examples are in parts by weight. The dicarboxylic acids were added in comparable molar quantities.

Nickel erosion (corrosion) resulting from the treatment with fountain solutions according to Examples 1 to 4 is represented in FIG. 1, as a function of time. From this diagram it is unexpectedly and clearly seen that using solutions with a content of citric acid, which is customarily present in fountain solutions, and also with tartaric acid in combination with triazoles (Comparative Examples 1 and 2; hydroxylated carboxylic acids) nickel erosion is already at the beginning of action higher than in the case of adipic or benzene-1,2-dicarboxylic acid which are used according to the invention (Examples 3 and 4; non-hydroxylated dicarboxylic acids). However, the corrosion-inhibiting effect appears particularly clearly and surprisingly over a prolonged period of time. In Examples 3 and 4, corrosion comes to a standstill after a short time, whereas it rises constantly in Comparative Examples 1 and 2. As compared with the invention, corrosion in Comparative Examples 1 and 2—computed for days or weeks, as should be done for practical purposes—is higher by powers of ten.

Examples of formulations containing phosphoric acid, which have an additional corrosion-inhibiting effect with respect to iron are:

TABLE 2

| | | Comparison | | Invention |
|---|---|---|---|---|
| Example | | 5 | 6 | 7 |
| polyglycol 400 | | 2 | 2 | 2 |
| tolyltriazole | | — | 1 | 1 |
| 1 H-benzotriazole | | 1 | — | — |
| *citric acid.1$H_2O$ | | 7.4 | 7.4 | — |
| succinic acid | | — | — | 4.3 |
| phosphoric acid, 85% | | 1.5 | 1.5 | 1.5 |
| i-propanol | | 20 | 20 | 20 |
| fully demineralized water + NaOH, for adjustment to pH **up to 100 | ** | 5.01 | 4.96 | 5.00 |
| 2% strength dilution in fully demineralized water | pH | 4.8 | 4.7 | 4.7 |

Figure 2:
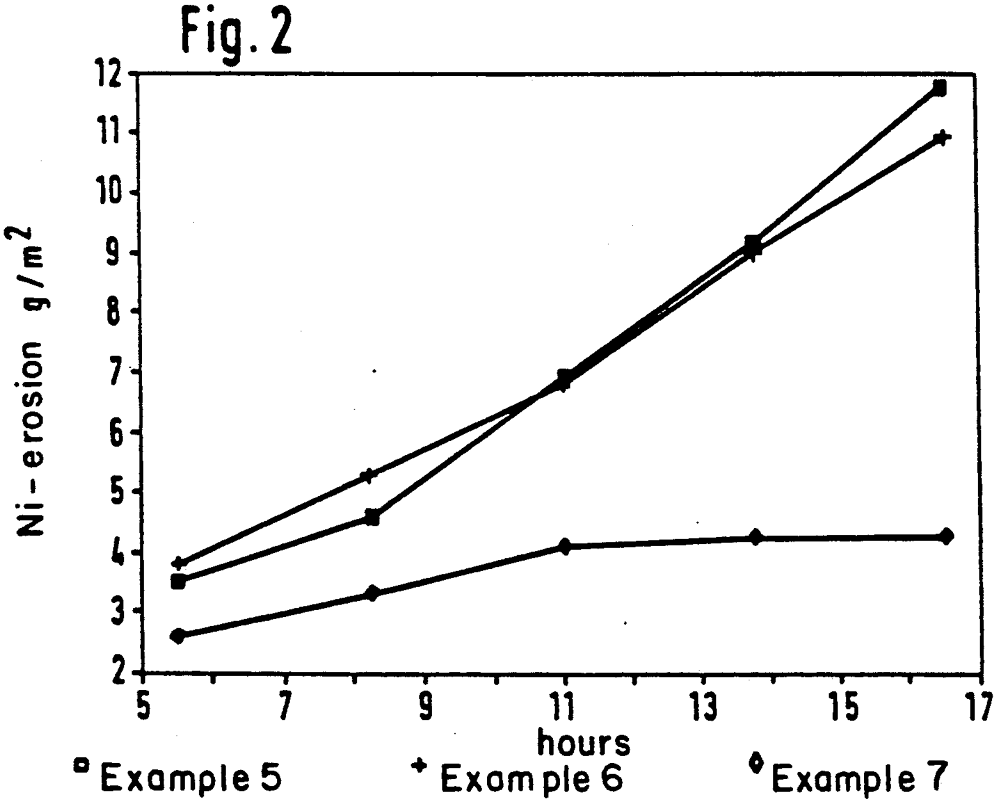

The compositions of Examples 5 to 7 were used for the corrosion test in the form of 2% strength solutions in distilled water, as in Examples 1 to 4. The corrosion results obtained are compiled in FIG. 2.

This diagram shows that the addition of phosphoric acid slightly increases nickel corrosion, as compared with Examples 3 and 4 but that, also in this case, the combination of tolyltriazole with the non-hydroxylated dicarboxylic acid (succinic acid) has a clear advantage over citric acid. Here, corrosion of the nickel also comes to a standstill after initial erosion (long-term inhibition). In the combination of tolyltriazole with citric acid, on the other hand, erosion rises constantly. Printing characteristics of the plates are good, if a fountain composition according to Example 7 is employed.

EXAMPLE 8

Figure 3:
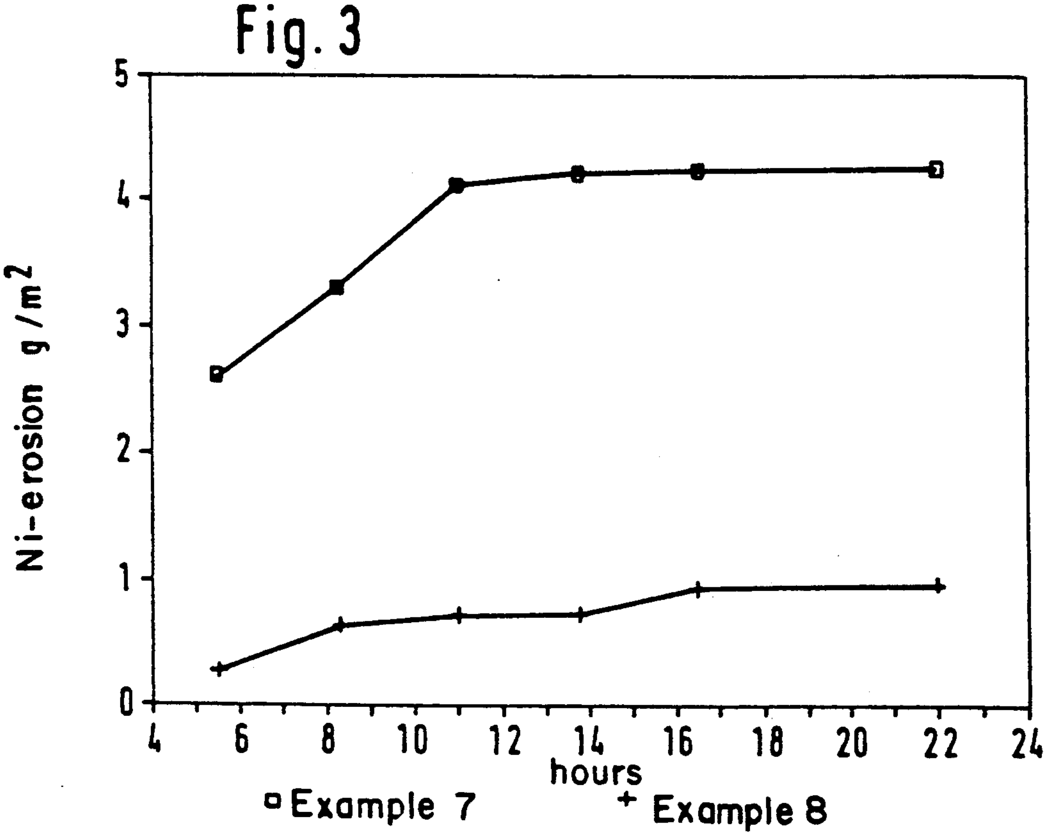

If 0.3 part by Weight (pbw) of dioctyldimethylammonium chloride is added to the formulation of Example 7, a further reduction of erosion is obtained, according to the diagram shown in FIG. 3. The addition clearly shows an additional corrosion-inhibiting effect. A comparable effect is obtained using dibutylammonium caprylate.

EXAMPLE 9

A fountain solution concentrate prepared according to Example 1 with 5.1 pbw of pimelic acid or 3-methyladipic acid, instead of citric acid, and adjusted to pH 5.0 yields, in a 2% strength dilution with fully demineralized water, a nickel erosion curve according to FIG. 1, which extends along the zero line, i.e. there is no nickel removed.

EXAMPLE 10

A fountain solution concentrate according to Example 2, but prepared with 5.7 pbw of aminosuccinic acid instead of tartaric acid and adjusted to pH 5.0 is, in a 2% strength dilution with fully demineralized water, examined for corrosive effects on nickel as described above. No nickel was removed. The curve according to FIG. 1 extends along the zero line.

The invention provides improved fountain compositions for printing shop practice. They have an excellent buffer capacity and yield a uniform dampening at a low water requirement. Roll-up behavior of the printing plates is very good and spoilage is low. Smearing, sticking or foaming do not occur. Protection against the corrosion of nickel is excellent and even the corrosion of iron is considerably reduced if phosphoric acid and/or phosphates are added.

What is claimed is:

1. A fountain composition for use in offset printing which comprises:

a) a hydrophilic thickening agent;

b) about 0.3 to 5% by weight of a triazole; and c) about 1 to 15% by weigh of at least one non-hydroxylated dicarboxylic acid, dicarboxylic acid said or a mixture thereof, wherein said composition is effective in a solution having a pH between about 4.7 to 5.3.

2. A fountain composition as claimed in claim 1, wherein the composition comprises a further buffer substance.

3. A fountain composition as claimed in claim 1, wherein said triazole is a substituted triazole.

4. A fountain composition as claimed in claim 3, wherein said triazole is substituted by aromatic groups.

5. A fountain composition as claimed in claim 4, wherein said triazole is an aromatic triazole substituted by electron donors.

6. A fountain composition as claimed in claim 1, wherein said triazole is 1 H-benzotriazole.

7. A fountain composition as claimed in claim 1, wherein said triazole is tolyl triazole.

8. A fountain composition as claimed in claim 1, wherein said dicarboxylic acid is a saturated acid having 4 to 10 carbon atoms.

9. A fountain composition as claimed in claim 1, wherein said dicarboxylic acid is an aminodicarboxylic acid or a branched dicarboxylic acid.

10. A fountain composition as claimed in claim 1, wherein said triazole is tolyltriazole and said dicarboxylic acid is adipic acid, 3-methyladipic acid, benzene-1,2-dicarboxylic acid, succinic acid, aminosuccinic acid or pimelic acid.

11. A fountain composition as claimed in claim 1, which further comprises a dissolving intermediary, a wetting agent, a defoamer, a biocide or a mixture thereof.

12. A fountain composition as claimed in claim 1, which further comprises at least one ammonium salt of the general formula $R_nH_mN^+X$, where X is an anion of a carboxylic acid, n is 1 to 4, m is 0 to 3, (n+m) is 4 and R is alkyl or aryl, and wherein if n is greater than 1 each R is the same or different.

13. A fountain composition as claimed in claim 12, wherein R is alkyl.

14. A fountain composition as claimed in claim 1, which further comprises at least one corrosion inhibitor for iron.

15. A fountain composition as claimed in claim 14, wherein said corrosion inhibitor for iron is selected from the group consisting of phosphoric acid, orthophosphoric acid, polyphosphoric acid and a salt thereof.

16. A fountain composition as claimed in claim 1, wherein the ratio between triazole and dicarboxylic acid is about 2:1 to 1:20.

17. A fountain composition as claimed in claim 16, wherein said ratio is 1:1 to 1:10.

18. A fountain composition as claimed in claim 2, which comprises as a buffer, at least one salt formed from a weak acid having a dissociation constant between about $5 \cdot 10^{-4}$ and $8 \cdot 10^{-5}$ in the first stage and a strong base.

19. A fountain composition as claimed in claim 18, wherein said acid is an organic acid.

20. A fountain solution for offset printing machines, comprising about 0.5 to 5.0% by weight of the fountain composition as claimed in claim 1 with the remainder being water.

21. A fountain solution as claimed in claim 20, comprising 1.0 to 3% by weight of said fountain composition.

* * * * *

UNITED STATES PATENT AND TRADEMARK OFFICE
CERTIFICATE OF CORRECTION

PATENT NO. : 5,096,487

DATED : March 27, 1992

INVENTOR(S) : Loni Schell

It is certified that error appears in the above-identified patent and that said Letters Patent is hereby corrected as shown below:

Column 5:

Claim 1, line 61, "said" should read --salt--;

Column 6:

Claim 12, line 32, "$R_nH_mN^+X$" should read --$R_nH_mN^+X^-$--;

"X" should read --$X^-$--.

Signed and Sealed this

Twentieth Day of July, 1993

Attest:

Michael K. Kirk

MICHAEL K. KIRK

*Attesting Officer*

*Acting Commissioner of Patents and Trademarks*